United States Patent [19]
Richards

[11] 3,882,543

[45] May 6, 1975

[54] TAPE HEAD MOUNT AND ALIGNMENT MEANS

[75] Inventor: William D. Richards, Medway, Mass.

[73] Assignee: American Optical Corporation, Southbridge, Mass.

[22] Filed: Sept. 10, 1973

[21] Appl. No.: 396,026

[52] U.S. Cl. .......... 360/109; 360/104

[51] Int. Cl. .......... G11b 5/56; G11b 21/24

[58] Field of Search .......... 179/100.2 CA; 274/4 A, 274/11 A; 360/109, 130

[56] References Cited

UNITED STATES PATENTS

| | | | |
|---|---|---|---|
| 2,958,736 | 11/1960 | Akai | 360/109 |
| 3,440,359 | 4/1969 | Page et al. | 179/100.2 CA |
| 3,692,314 | 9/1972 | Dattilo | 274/4 A |
| 3,710,037 | 1/1973 | Adams et al. | 179/100.2 CA |

FOREIGN PATENTS OR APPLICATIONS

| | | | |
|---|---|---|---|
| 714,232 | 7/1965 | Canada | 179/100.2 CA |

*Primary Examiner*—Vincent P. Canney
*Assistant Examiner*—R. S. Tupper
*Attorney, Agent, or Firm*—Joel Wall; William C. Nealon; H. R. Berkenstock, Jr.

[57] ABSTRACT

There is disclosed a tape head mount which facilitates both azimuth and elevation adjustment for a tape head which is inserted into a head-receiving opening in the mount. At least two set screws are provided to adjust the orientation of the tape head within the head-receiving opening. The tape head may rest upon a chord-shaped rocker which is rotated to the proper support position.

7 Claims, 3 Drawing Figures

PATENTED MAY 6 1975 3,882,543

TAPE HEAD MOUNT AND ALIGNMENT MEANS

This invention relates generally to tape head mounts and, more particularly, to a tape head mount for facilitating azimuth and elevation adjustment of a tape head.

As is well known in the art, for the proper operation of a high-accuracy tape system, the tape head should be aligned properly. This is particularly true for systems utilizing separate record and playback units, for example, where two-track signals on a cassette tape are recorded on one tape unit and played back on another. For example, in certain medical applications, a patient carries a portable recording unit in which a timing signal is recorded on one track of a cassette tape and the patient's EKG signal is recorded on another track. The cassette is then removed and the tape is played back in a separate playback unit, for example, at a doctor's office. The timing signal can be used to control flutter compensation, which compensation is especially needed in the case of slow-speed recording. But if the recording and playback heads are not aligned relative to the tape in the same way, the timing signal will be played back with an improper timing relation to the EKG signal, and proper compensation will not be possible. For this reason, the heads should be adjustable so that each of them can be aligned properly with the tape.

Various techniques have been devised in order to provide tape head azimuth adjustment in cassette-type systems. According to one proposal, the tape from the cassette is withdrawn from the cassette body thereby providing space for more accurate tape alignment mechanisms. Other systems utilize complex tape alignment mechanisms which are built into the cassettes. However, both of these proposals and other attempted solutions have been less than satisfactory, primarily because of their costs and complexities.

Accordingly, it is a broad object of the present invention to provide an improved head mount for facilitating tape head alignment.

Another object of this invention is to provide an azimuth and elevation control for a tape head which is compact in size, simple in operation, relatively inexpensive to fabricate, and accurate in operation over a long period of time.

These and other objects of the present invention are accomplished by providing a tape head mount adapted to receive a tape head. The tape head mount includes a head-receiving opening which is generally circular in cross-section and which is adapted to receive a tape head of rectangular cross-section. The tape head rests on a chord-shaped rocker which is inserted into the head-receiving opening. At least two set screws on top of the head are provided for orienting the tape head relative to the head-receiving opening; when one of the screws is tightened and the other loosened, the head rotates with the rocker. The axis of rotation is along the center line of two tape guides which are positioned on either side of the tape head. According to one embodiment of the invention, another set screw is provided for raising the chord-shaped rocker to control the elevation of the tape head. According to another embodiment of the invention, the chord-shaped rocker is adapted to receive shims for controlling the elevation of the tape head.

A more complete description of the present invention will now be understood by reference to the following detailed description of a presently preferred but nonetheless illustrative embodiment, when taken in conjunction with the accompanying drawings, wherein.

Figures 1, 2, 3:
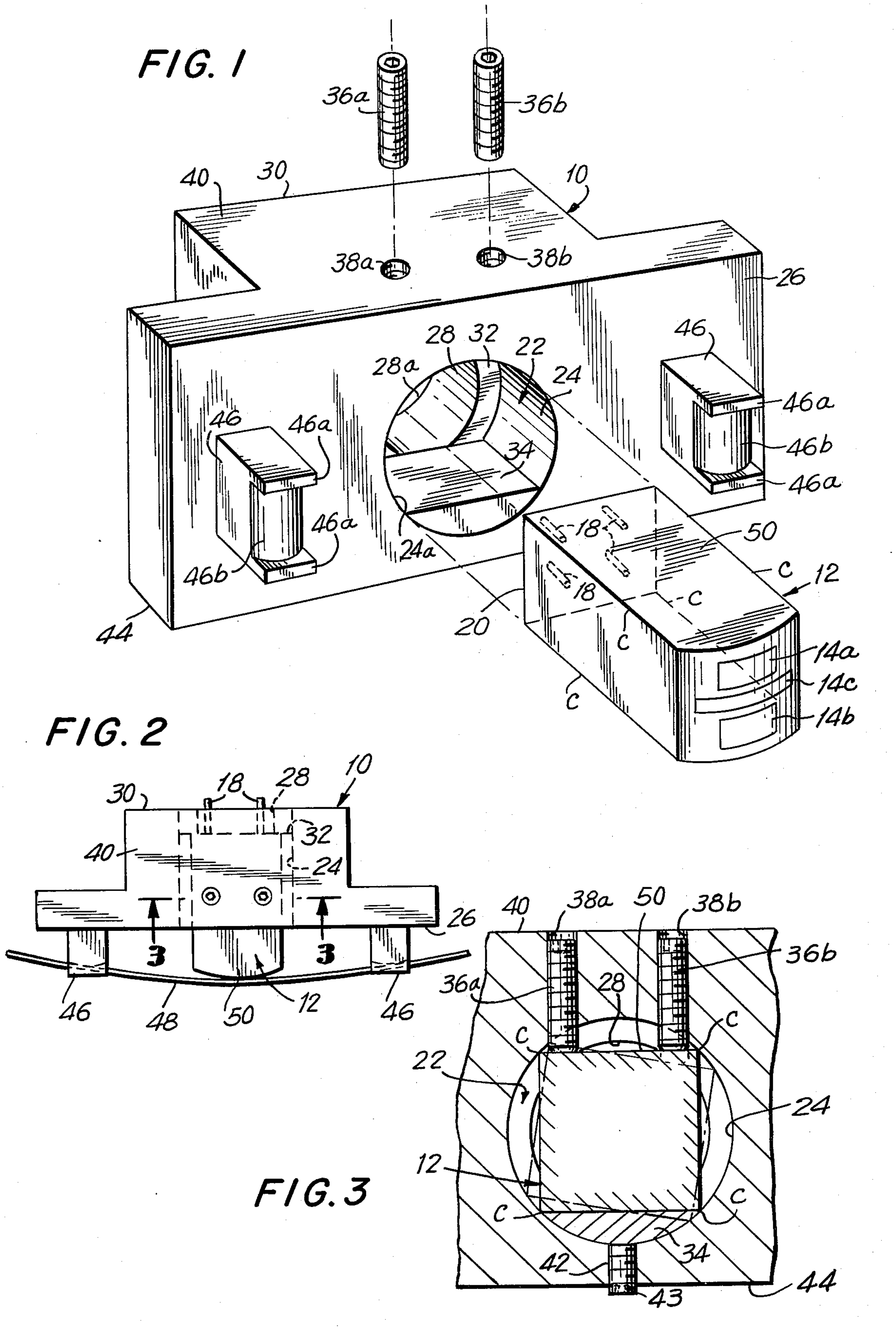
FIG. 1 is an exploded, front perspective view of a tape head mount and tape head according to the present invention.
FIG. 2 is a top plan view, slightly reduced in scale, of the present invention, showing the tape head inserted into the tape head mount; and, FIG. 3 is a partial sectional view, slightly enlarged in scale, taken substantially along the line 3—3 in FIG. 2.

Referring now to the drawings and, more particularly, to FIG. 1 thereof, a tape head mount 10 is adapted to receive a conventional tape head 12 which is generally rectangular in cross-section. Tape head 12 includes two magnetic heads **14*a*, 14*b*, separated by a magnetic shield 14*c***, as is known in the art, to provide isolation between the two channels.

The two magnetic heads record signals on a magnetic tape (not shown) which moves past the tape head. One of the signals may be a timing signal generated by an oscillator. Another may be an information signal for example, a signal proportional to a patient's electrocardiogram. Pins 18, disposed at the back end 20 of tape head 12, are provided for connecting the various signal sources to the magnetic heads.

Tape head 12 is adapted to be mounted in tape head mount 10, with the tape head being inserted into head-receiving opening, generally designated 22. Head-receiving opening 22 is generally circular in cross-section and, specifically, is machined in tape head mount 10 to include a first cylindrical bore portion 24, having an opening **24*a* at the front surface 26 of tape head mount 10, and a second cylindrical bore portion 28, having an opening 28*a* at the rear surface 30 of the tape head mount. The internal diameter of the front circular bore portion 24 is greater than the internal diameter of the rear circular bore portion 28. Thus, the two bores cooperate to define a circular shoulder 32 which, as will be explained hereinafter, is provided to act as a stop for limiting the insertion of tape head 12** into the head-receiving opening.

Disposed within head-opening 22 is a chord-shaped rocker which is located within bore portion 24 and is adapted to be rotated along the cylindrical bore surface. As will be explained hereinafter, the chord-shaped rocker functions as a support for the tape head.

In order to control the azimuth adjustment of tape head 12 relative to tape head mount 10 and, therefore, relative to a tape passing across the head, tape head mount 10 is adapted to receive set screws **36*a*, 36*b*, which are inserted into respective threaded screw-receiving openings 38*a*, 38*b* which extend from the top surface 40 of the tape head mount to the first bore portion 24 (see FIG. 3). As will be explained, set screws 36*a*, 36*b* are moved, within the threaded screw-receiving openings 38*a*, 38*b*, to control the orientation of tape head 12 within first bore portion 24, and therefore, to control the azimuth orientation of the tape head. Another threaded screw-receiving opening 42, shown in FIG. 3, extends between first bore portion 24 and the bottom surface 44 of tape head mount 10, and may receive a set screw 43** for a reason to be described below.

Tape guides 46, which project from front surface 26 of the tape head mount, are provided for guiding the tape past the tape head, as is generally known in the art.

Specifically, each of tape guides 46 defines guide ends 46*a*, which function to confine the tape to, and guide the tape across, hardened rounded guide surfaces 46*b*.

The first bore portion 24 of the head-receiving opening is machined such that its inside diameter is substantially equal to, but slightly larger than, the diagonal dimension of tape head 12, that is, the distance between diagonal corners of the head, taken in a plane perpendicular to the longitudinal axis of the head. The two dimensions preferably differ by less than 0.0015 inches. As such, the four corners C of the tape head (see FIG. 1) are all located near the surface of bore 24 (see FIG. 3). In order to provide support for the head, it rests on chord-shaped rocker 34 (see FIG. 3) within the bore. Such a "full" support is preferred over the alternative technique of allowing the two lower edges C to bear against the surface of bore 24.

Initially, all of the set screws are loosened so that the tape head can be fully inserted into the head-receiving opening 22 such that shoulder 32 abuts against the back end 20 of the tape head; in this position, the pins 18 of the tape head are accessible at the opening 28*a* of the rear circular bore portion of the tape head mount, and the pins can be connected to the channel amplifiers.

The elevation of the tape head relative to the tape head mount and, therefore, relative to any tape passing across the tape head, can then be set. This may be accomplished by placing a precision gauge 48 across the head and guides 46 (see FIG. 2) and adjusting set screws 36a, 36b and 43. By tightening set screw 43 and loosening the other two, the chord-shaped rocker 34 can be raised; it can be lowered in a similar manner. The height adjustment is generally not critical, especially where the gains of the two channels need not be exactly equal. The height adjustment is, of course, limited by the difference between the internal diameter of bore 24 and the diagonal dimension of the tape head. Alternatively, the elevation of the tape head may be changed by placing shims between the head and the rocker; again, the correct height is determined visually by observing the position of the front of the head relative to gauge 48. The use of shims, in which case set screw 43 may be omitted, is preferred; otherwise, the head and rocker assembly may be supported solely by set screw 43.

After the elevation of the tape head has been set, the angular position of the tape head may be set by adjusting set screws 36*a*, 36*b*. A test tape with the same signal recorded over its entire width is moved past the tape head and the signals on the two channels are tested to see if they are in phase. If the signals are out of phase, the set screws 36*a*, 36*b* are adjusted to control the orientation of the tape head within bore portion 24, that is, to make the signals in phase. By way of example, as indicated (in an exaggerated fashion) in FIG. 3, set screw 36*a* can be loosened and set screw 36*b* can be tightened, in order to rotate the tape head, on its common axis with the bore, from the position indicated in solid lines to the position indicated in dashed-dot lines. This adjustment is possible because chord-shaped rocker 34 can rotate within bore 24. Both set screws are adjusted until proper azimuth alignment is achieved, that is, until the signals on the two channels are in phase, at which time the loosened set screw may be tightened (without changing the tape head position).

It should be noted that after the tape head height adjustment is made, the adjustment of set screws 36*a* and 36*b* causes the tape head to rotate around an axis which remains at the previously set elevation level.

Obviously, other modifications of the invention are possible in light of the foregoing disclosure. For example, the head-receiving opening 22 need not be circular in its entire cross-section, i.e., it need not be a cylindrical bore. Thus, the bore portion 24 need be circular or curved only in the vicinities of the corners C of the tape head and the rocker to allow orientation of the head within the bore by manipulation of the set screws. Further, although the invention has been disclosed with reference to a tape head having two channels which are adapted to record signals on a tape, it is readily apparent that the invention has wide applicability to tape heads having any number of channels and that it may be utilized in playback units as well as record units.

It should be understood, therefore, that the foregoing is merely representative of the present invention and other embodiments may be devised, within the spirit and scope of the present invention, as more particularly defined by the appended claims.

What is claimed is:

1. A tape head mount comprising headreceiving opening means for providing a head-receiving opening and for receiving therein a tape head of generally rectangular cross-section, said head-receiving opening having cylindrical inner surface means for supporting the tape head in the vicinities which receive the edges of the tape head, means for limiting the insertion of the tape head within said head-receiving opening, a pair of tape guides disposed on opposite sides of said head-receiving opening in the direction of tape travel, and a pair of screw means extending into said head-receiving opening means for bearing against the same side of an inserted tape head, said screw means in cooperation with said cylindrical inner surface means for controlling the rotation of the tape head within said head-receiving opening around the substantially central axis of said cylindrical inner surface means which axis remains fixed near the center line of the tape guides in the direction of tape travel.

2. A tape head mount according to claim 1 wherein said head-receiving opening is a cylindrical bore.

3. A tape head mount according to claim 2 wherein the diameter of said cylindrical bore is substantially equal to but larger than the distance between the diagonal corners of the tape head.

4. A tape head mount according to claim 1 further including a chord-shaped rocker conformingly mounted within said head-receiving opening for supporting on the chord of said rocker the side of a tape head which is opposite the side against which said pair of screw means bear.

5. A tape head mount according to claim 4 further including means for adjusting the elevation of the tape head in the direction of said screw means.

6. A tape head mount comprising head-receiving opening means for providing a head-receiving opening and for receiving therein a tape head of generally rectangular cross-section, said head-receiving opening having cylindrical inner surface means for supporting the tape head in the vicinities which receive the edges of the tape head, means for limiting the insertion of the tape head within said head-receiving opening, a pair of tape guides disposed on opposite sides of said headreceiving opening in the direction of tape travel, and a pair of screw means extending into said head-receiving opening means for bearing against the same side of an inserted tape head, said screw means in cooperation with said cylindrical inner surface means for controlling the rotation of the tape head within said head-receiving opening around an axis which remains fixed near the center line of the tape guides in the direction of tape travel, and wherein said head-receiving opening is a cylindrical bore whose diameter is substantially equal to but larger than the distance between the diagonal corners of the tape head, and further including a chord-shaped rocker conformingly mounted within said head-receiving opening for supporting on the chord of said rocker the side of a tape head which is opposite the side against which said pair of screw means bear.

7. A tape head mount according to claim 6 further including means for adjusting the elevation of the tape head in the direction of said screw means.

* * * * *